US011852718B2

(12) United States Patent
Ostermann et al.

(10) Patent No.: US 11,852,718 B2
(45) Date of Patent: Dec. 26, 2023

(54) SYSTEM AND METHOD FOR DETERMINING A CHANGE OF POSITION AND ORIENTATION OF AN OBJECT

(71) Applicants:Joern Ostermann, Hannover (DE); Aron Sommer, Cologne (DE)

(72) Inventors: Joern Ostermann, Hannover (DE); Aron Sommer, Cologne (DE)

( * ) Notice: Subject to any disclaimer, the term of this patent is extended or adjusted under 35 U.S.C. 154(b) by 814 days.

(21) Appl. No.: 16/576,210

(22) Filed: Sep. 19, 2019

(65) Prior Publication Data

US 2020/0096629 A1 Mar. 26, 2020

(30) Foreign Application Priority Data

Sep. 21, 2018 (DE) .......................... 102018123334.5

(51) Int. Cl.
| | | |
|---|---|---|
| *G01S 13/90* | (2006.01) | |
| *G06T 7/70* | (2017.01) | |
| *G06V 10/20* | (2022.01) | |
| *G06V 20/64* | (2022.01) | |
| *G01S 13/00* | (2006.01) | |
| *G06V 10/46* | (2022.01) | |

(52) U.S. Cl.
CPC ...... *G01S 13/9023* (2013.01); *G01S 13/9005* (2013.01); *G06T 7/70* (2017.01); *G06V 10/255* (2022.01); *G06V 20/64* (2022.01); *G06V 10/46* (2022.01)

(58) Field of Classification Search
CPC ............. G01S 13/9005; G01S 13/9019; G01S 13/9023; G01S 7/411; G06V 10/46; G06V 20/64; G06V 10/255; G06T 7/70; G06T 2207/10016; G06T 2207/10044; G06T 7/248; G06T 7/74
See application file for complete search history.

(56) References Cited

U.S. PATENT DOCUMENTS

| | | | | |
|---|---|---|---|---|
| 5,184,134 A | * | 2/1993 | Niho | .................... G01S 13/9019 342/25 D |
| 7,884,752 B2 | * | 2/2011 | Hellsten | ................ G01S 13/904 342/25 A |
| 8,620,093 B2 | * | 12/2013 | Nguyen | ............... G06K 9/6244 382/218 |
| 10,789,569 B1 | * | 9/2020 | Anor | .................... G07G 1/0036 |

(Continued)

FOREIGN PATENT DOCUMENTS

JP 2017161358 A * 9/2017

*Primary Examiner* — Bernarr E Gregory

(57) ABSTRACT

The disclosure concerns a method for determining a change in position and orientation of an object using data from a synthetic aperture radar (SAR) with the following steps: acquiring a radar image containing the object; dividing the radar image into at least two subimages; acquiring short radar information comprising a first reflected pulse, which has been recorded by the radar and/or a quantity derived therefrom, the first reflected pulse having information about image data of the radar image; for the short radar information, performing an autofocus method which determines a change in distance for each of the at least two subimages; and determining the change in position and orientation of the object given for each point of the object by the respective change in distance of the corresponding subimage.

19 Claims, 5 Drawing Sheets

(56) References Cited

U.S. PATENT DOCUMENTS

2011/0299733 A1\* 12/2011 Jahangir ............. G01S 13/9029
 382/103
2015/0227022 A1\* 8/2015 Fluckiger ......... H04N 5/232123
 348/349

\* cited by examiner

SYSTEM AND METHOD FOR DETERMINING A CHANGE OF POSITION AND ORIENTATION OF AN OBJECT

PRIORITY

This application claims priority to German Application No. DE 10 2018 123 334.5, filed 21 Sep. 2018, the content of which is herein incorporated by reference in its entirety.

FIELD OF THE INVENTION

This disclosure is related to a method for determining a change in position and orientation of an object using data from a synthetic aperture radar (SAR), a method for determining a contour of the object, a method for classifying an object and a device.

BACKGROUND

In particular, state-of-the-art methods enable finding a single object in a radar image, which shows several similar objects. The term "finding" means that the method or the corresponding algorithm finds the section of the radar image, which contains an individual object. Such an object can be, for example, a ship on the open sea, which is illuminated by the radar. The radar is usually mounted on an airplane. Typical distances from the radar to the ship are in the order of 10 km. However, distances of a few meters up to about 100 km are also typical.

State-of-the-art methods are able to determine on the basis of a radar image with low resolution a rough position of every object in the radar image, in particular of every ship. Such a radar image can be computed, for example, by any SAR processing method such as Omega-K, Fast Factorized Backprojection or Global Backprojection. It is also known that a constant false alarm rate detector (CFAR detector) detects an object or estimates its center position.

Furthermore, state-of-the-art methods usually use a CFAR detector to determine points in a radar image, which act as strong reflectors such as reflections from corners or edges of a ship, which may act as so-called corner reflectors.

A state-of-the-art backprojection autofocus method usually search for the phase error of each pulse, which leads to maximal contrast. This autofocus method is widely used for the Global Backprojection (GBP) algorithm and provides good results if the radial acceleration of the object during the data acquisition time along the line-of-sight direction is less than the range resolution of the SAR system, i.e. the motion of the object in the line-of-sight direction can be assumed to be linear.

The above mentioned backprojection autofocus method is disclosed in M. I. Duersch, D. G. Long: Backprojection Autofocus for Synthetic Aperture Radar, Department of Electrical and Computer Engineering, Brigham Young University, 2013, as well as in J. N. Ash: An Autofocus Method for Backprojection Imagery in Synthetic Aperture Radar, IEEE Geoscience and Remote Sensing Letters, pp. 104-108, January 2012. The relevant contents of these two publications are part of the present application.

Other state-of-the-art autofocus methods determine a phase error and a corresponding change in distance for the entire radar image on the basis of an already determined radar image and on an additional radar pulse reflected by the object.

SUMMARY

The task of this disclosure is to improve the state-of-the-art.

The task is solved by a method, which determines a change in position and orientation of an object using data from a synthetic aperture radar (SAR) with the following steps: acquiring a radar image, which contains the object; dividing the radar image into at least two subimages; acquiring short radar information comprising a first reflected pulse and/or a quantity derived from the first reflected pulse, the first reflected pulse comprising information about image data of the radar image; applying an autofocus method for the short radar information which determines for each of the at least two subimages a change in distance; and determining the change in position and orientation of the object given for each point of the object by the respective change in distance of the corresponding subimages.

Thus a method can be provided, which determine a change in position and orientation of an object, in particular of a ship, in a radar image with high resolution.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
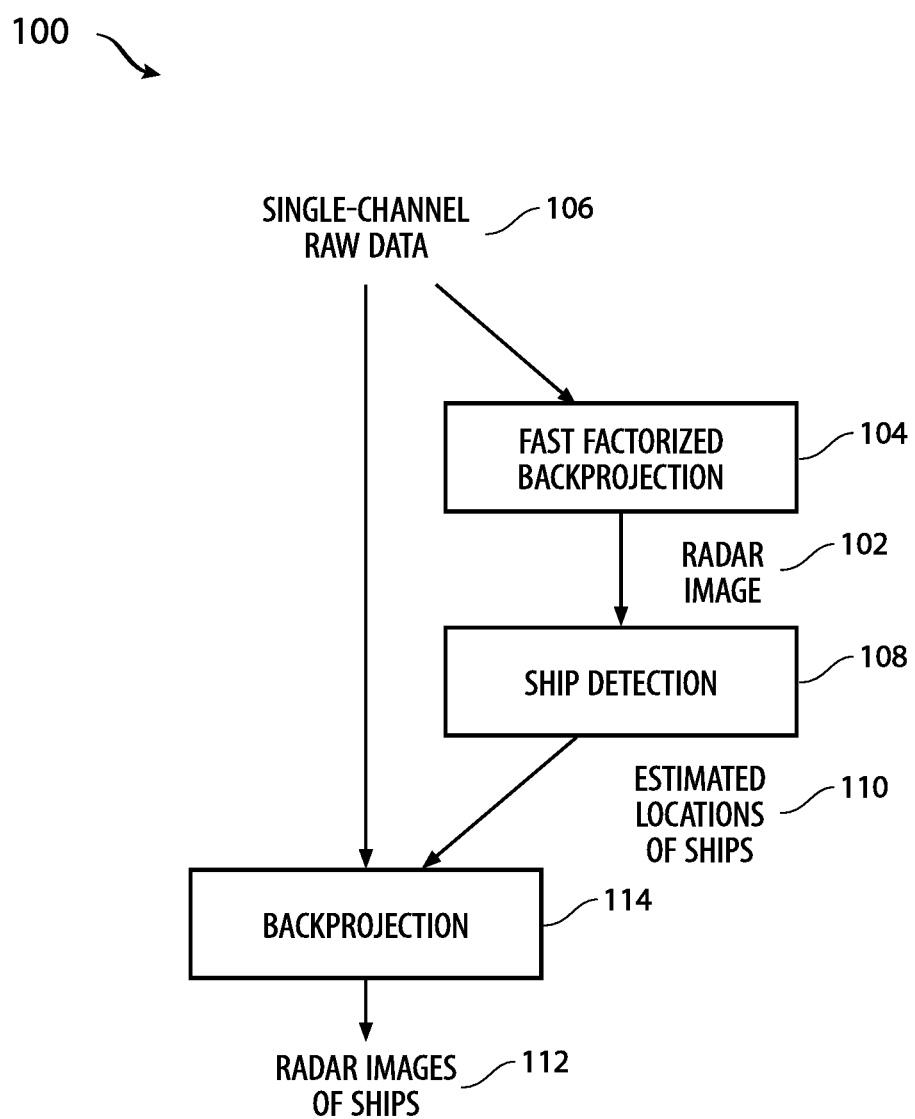
FIG. 1 shows the general procedure of acquiring SAR images of single ships.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As part of an introduction to the concepts provided in this disclosure, the following terminology is explained:

A "synthetic aperture radar" (SAR) belongs especially to the class of imaging radars and can be used as a sensor for remote sensing. In particular, the two-dimensional representations of a terrain obtained from such synthetic aperture radars, which is determined by illuminating the surface of the earth with electromagnetic waves, are very similar to photographic images and can therefore be interpreted by humans In addition, these radars can be used in all weather conditions, because, for example, clouds, rain, fog and darkness have only a minor influence on the radiation of electromagnetic waves. In particular, the term synthetic aperture radar covers the so-called autofocus synthetic aperture radar. Phase differences, which are caused, for example, by time differences due to noisy sensor data for determining the individual antenna positions, are compensated by a signal processor.

To create a SAR image, successive pulses of radio waves are transmitted to "illuminate" a target scene, and the echo of each pulse is received and recorded. The radio includes the basic hardware components such as a memory, processor, controller, transmitting antenna and/or a receiving antenna. The pulses are transmitted and the echoes received using, for example, a single beam-forming antenna, with wavelengths of a meter down to several millimeters. As the SAR device on board the aircraft or spacecraft moves, the antenna location relative to the target changes with time. Signal processing of the successive recorded radar echoes allows the combining of the recordings from these multiple antenna positions. This process forms the synthetic antenna aperture and allows the creation of higher-resolution images than would otherwise be possible with a given physical antenna.

An "object" is understood in particular as an object, such as a vehicle, an aircraft or a ship, which moves within the illuminated area with an (object) speed. Basically, the object can also be a person or an animal. The speed of the object is called "object speed". According to a preferred design it is assumed that the object can be approximated as a two-dimensional structure.

According to this disclosure, a "radar image" can be determined using a radar pulse or a variety of radar pulses. Within the limits of SAR technology, a distance to the radar can be determined for each pixel of a radar image. The radar image in the sense of the presented method forms the basis for determining a change in position and orientation of an object in the radar image.

A "reflected pulse" is a pulse emitted by the radar device, which is reflected by the object or its surroundings and received again by the radar device or recorded accordingly. The reflected pulse contains information about the image data of the radar image. For the purposes of this procedure, the first, second or further reflected pulse may also be a pulse which is used or has been used to determine the above radar image.

"Short radar information" includes at least one reflected pulse or at least one quantity derived from it or at least one reflected pulse comprising information about image data of the radar image. Thus the term short radar information can be understood as the information which has at least one reflected pulse. The information which has a reflected pulse can be described by a mathematical function which describes the amplitude and phase of a received signal as a function depending on frequency or as a function depending on time.

The term "radar image" refers to image data which are preferably represented in a 2-dimensional matrix of picture elements or pixels which each have an amplitude and a phase. A brightness value of the pixels corresponds to the amplitude or a reflectivity and/or an intensity of the radar signal. In particular, an image has a given height and a given width.

The term "dividing the radar image into at least two subimages" means that the image data is divided into a large number of disjunctive areas so that the sum of the disjunctive areas results in the original image data. However, the division can also be done in such a way that the image data is divided into a number of areas, whereby two different subimages can overlap, i.e. the different subimages have joint and disjoint pixels. It is also possible to divide the images in such a way that they do not overlap and do not have joint points or regions.

"Applying an autofocus procedure" means applying any procedure that improves the focus for at least one point of the radar image or at least one point of a subimage. In particular, for one of the at least two subimages, this means that a change in distance integrated over all points of the subimage is determined. For example, the autofocus procedure can also be performed using a first pulse which was either already used to generate the original radar image or which is an additional pulse and which was not used to generate the original radar image.

The concept of applying the autofocus procedure may also include determining a sharp radar image obtained from the original radar image and obtaining additional information by the autofocus procedure.

A "quantity derived from at least one reflected pulse" can be, in particular, a filtered received signal, a Fourier transform of the unfiltered or the filtered received signal, or a phase error. A phase error corresponds to a change in distance of the corresponding subimage.

An aspect of this disclosure can be thus based on the fact that the autofocus method is not applied to the entire radar image of an object, for example a ship, but that the radar image of this object is divided into at least two subimages and an autofocus method is applied for each subimage so that a change in distance can be determined for each subimage. A change in position and orientation of the object can be determined from the changes in distance of the respective subimages.

Since the distance from the radar to each pixel is also known in the originally acquired radar image, an absolute position and an absolute orientation of the object can also be determined. Since the position and the orientation of the object are known for the data acquisition time, a motion of the object can easily be determined.

In order to obtain a sharp radar image of the moving object, the determined changes in distance of the respective subimages or the corresponding changes in position and orientation are taken into account starting from the originally acquired radar image. For example, using the backprojection algorithm, a sharp radar image can be generated from the original radar image using further additional reflected pulses and the determined change in position and orientation of the object. This procedure can now be done iteratively so that the sharp radar image is used as the original radar image and further reflected pulses are used for further changes in position and orientation.

Filtered backprojection can be described as follows. Assume that there are a finite number of projections of an object which contains radioactive sources. The projections of these sources at 45 degree intervals are represented on the sides of an octagon. The basic idea behind back projection is to simply run the projections back through the image (hence the name "back projection") to obtain a rough approximation to the original. The projections will interact constructively in regions that correspond to the emittive sources in the original image. A problem that is immediately apparent is the blurring (star-like artifacts) that occur in other parts of the reconstructed image. One would expect that a high-pass filter could be used to eliminate blurring, and that is the case. The optimal way to eliminate these patterns in the noiseless case is through a ramp filter. The combination of back projection and ramp filtering is known as filtered back projection.

The procedure is preferably performed for a single object.

There are several known methods to determine the position of the object in the radar image. For example, Prominent Point Processing can be used to determine a change in position, see W. G. Carrara, R. S. Goodman, R. M. Majewski: Spotlight Aperture Radar—Signal Processing Algorithm, Boston Artech House, 1995, incorporated herein by reference.

In order to identify subimages containing the ship, the amplitude and/or the intensity of the subimages can be averaged. This procedure is preferably used if other methods, in particular methods, which are easier to implement, were not successful in the task of identifying the subimages, which belong to the object.

For the determination of the change in position and orientation of the object, only those subimages of the at least two subimages are considered preferentially, for which a change in distance was determined, which is larger than a given first threshold in magnitude. This ensures that subimages of the radar image, which do not contain any part of the object or in which only a small part of the subimage represents image elements of the object, are not taken into account for determining the change in position and orientation of the object.

It might happen that changes in distance for several subimages have large fluctuations. This might be the case, for example, if waves of the sea cover the main part of the subimage. In these cases it is preferred that the changes in distance of the respective subimages are averaged over time or over several pulses. It is also preferred to discard subimages that have a change in distance greater than a second given threshold. Distance changes that are greater than the second given threshold are unrealistically large.

According to a preferred design, the value of such a second threshold is 10 cm for one pulse, which corresponds to a speed change of approximately 100 m/s if the object is a ship. Here it was assumed that about 1000 pulses per second are transmitted. This is a typical value for airborne radars. If the object is an airplane, such a second threshold is much higher.

To acquire the radar image, a short data acquisition time interval can be used such that a motion of the object during this interval can be assumed to be linear. This ensures that the object shown in the radar image is not distorted. A motion can be assumed to be linear if the differences in the acceleration values of individual parts of the object, such as the stern and front of a ship, along line-of-sight direction during the data acquisition time are smaller than the range resolution.

A preferred data acquisition time interval is less than 0.5 seconds. For SAR radar images and ships as objects, the specified data acquisition time interval achieves good experimental results.

A center point of the object or a strong reflector of a subimage can be determined using a CFAR detection method. A CFAR detection method can also be used to identify prominent subimages. A CFAR detection method can also be used to improve the coordinate represented by the subimage, for example by using the position of a strong reflector instead of the center.

Preferably, the short radar information has a first reflected pulse and a second reflected pulse or a quantity derived from the first reflected pulse and/or the second reflected pulse, the first reflected pulse and/or the second reflected pulse having information about image data of the radar image.

Thus, the autofocus method can be applied not only using one reflected pulse but also using two reflected pulses.

According to another design, the autofocus procedure can be applied using at least three reflected pulses. In this case, the short radar information has at least three reflected pulses and/or at least one quantity derived from the at least three reflected pulses.

To apply the autofocus procedure, those phase changes of the first or second reflected pulse can be determined which maximize an image sharpness of the subimages, whereby a change in distance can be determined for each subimage.

The term "image sharpness" can be understood as a contrast, an entropy or a medium intensity of the corresponding subimage. Thus for each subimage a change in distance is obtained, which corresponds to a motion of the corresponding part of the object with respect to the last radar image.

Furthermore, the subimages of the radar image or the entire radar image can be updated on the basis of the information on image data of the radar image of the first or second reflected pulse and on the basis of the current position of the radar receiver as well as on the basis of the determined change in distance. Alternatively or additionally, the resolution of the radar image or the subimages can be improved.

To determine the change in distance from the radar to all subimages, the image sharpness of the respective subimages can be maximized using the additional constraint that the function which assigns the respective value of the change in distance to each center of a subimage is approximated by a plane. As an alternative to the center of a subimage, the position of a strong reflector in each subimage can be used. This characteristic is based on the idea that the object can be approximated as a two-dimensional structure.

In particular, the object can be a ship on the open sea, which is typically illuminated from a distance of about 10 km from an airplane. When this two-dimensional object moves, there may be a fixed point, which can be for example the rotation center. Here it is assumed that the points of the object are indicated at any time starting from a determined center point of the object. The other points of the two-dimensional image, which are not the fixed point, show a change in distance, which, if applied as a function of a location of the radar image, lie in one plane.

This can be explained as follows: Points which are close to the fixed point show a small change in distance, whereas points which are far away from the fixed point show a higher change in distance. If a point on the left side of the fixed point has a positive change in distance, there must be a corresponding point on the right side of the fixed point which has a negative change in distance. This feature ensures that the procedure can be performed with increased precision.

If the radar image is divided into at least three subimages, a plane of the object can be mathematically adapted by at least three points, whereby the at least three points correspond to centers of the at least three subimages and respective changes in distance are considered. As an alternative to the center of a subimage, the position of a strong reflector in each subimage can be used.

According to a preferred execution form, in which the object is a ship on the open sea, an image grid is generated in a preprocessing, which assigns a coordinate on the sea surface to each pixel. Thus the distance from the radar antenna to each pixel is known at any time in the radar image. Alternatively, a non-uniform three-dimensional voxel grid can be used.

If the object can be well represented as a 2-dimensional structure, the at least three center points or the positions of the respective strong reflectors of the at least three subimages lie on a plane. This ensures that the procedure can be performed with increased precision.

In another aspect, the task is solved by a procedure for determining a contour of the object. For this purpose, first, a procedure described above for determining a change in position and orientation of an object is performed. Starting from the set which is given by the subimages with the corresponding centers or strong reflectors as well as the corresponding changes in distance, those centers or points of strong reflectors are determined for which a change in distance is larger than the given second threshold. Those subimages, which only show the background, have a change in distance, which is smaller than the given first threshold or larger than the second threshold.

Furthermore, a subimage may be ignored which lies inside the object and has no change in distance or a too large change in distance. Thus only those subimages are considered, which show parts of the object, with the exception of a not moving inner subimage.

In the following step of the procedure, the subset of the determined center points or the points of the strong reflectors is connected to a closed polygon course, which maximizes an enclosed area, in particular within the depicted object. For this a start takes place at an external point and connects it with adjacent external points until a closed polygon course is obtained. The polygon course obtained corresponds to the contour of the object. In particular, the perspective of the radar is taken into account. The subset of the determined center points or the points of strong reflectors identify those subimages, which belongs to the ship.

In a further aspect the task is solved by a procedure for the classification of an object, in particular a ship. For this purpose, the contour of the object, which is determined according to the method for determining a contour of the object, and in particular the image content of the radar image enclosed by the contour is assigned to a known contour of an object belonging to a given class. The radar image is also preferably used to obtain more information about the contour or structure of the object, which facilitates classification of the object. The advantage of this is that objects contained in SAR radar images with high resolution can be identified. Any classification model or machine-learning model can be applied for the purpose of classifying the object.

In another aspect, the task is solved by a device for performing one of the methods described above, i.e. a method for determining a change in position and orientation of an object using data from a synthetic aperture radar, a method for determining a contour of the object and a method for classifying the object. An example device disclosed herein is a synthetic aperture radar.

In the following, the concepts disclosed herein are explained using an execution example and the figures. The following example describes a backprojection autofocus procedure, in which a radar image of a moving ship with high resolution is determined by means of a SAR radar.

A series of steps 100 is shown in FIG. 1. A radar image 102 in FIG. 1 is acquired by the synthetic aperture radar method with low resolution from a certain section of the sea on which several ships are located. Here the radar device is on board an airplane, which flies at a height of approx. 4000 m over the sea. This radar image 102 is obtained with a SAR processing technique such as fast factorized backprojection 104 from the singe-channel raw data 106. This generates an image grid that assigns a coordinate on the sea surface to each pixel. Thus the distance from the radar to each pixel is known at any time.

The next step is to determine a single ship among the large number of ships. There are a number of mathematical methods for this. At present, a CFAR detector 108 is used to detect ships and estimate their central positions 110. All points of the ship are measured relative to this center position x0. The height of the determined ship is set to zero in good approximation.

In addition, a radar image 112 with a very short data acquisition time t0 of 0.1 seconds centered at the center position x0 5 is acquired by backprojection 114 using also the singe-channel raw data 3. This image serves as the basis for all subsequent pulses. This is possible since the ship moves only a little bit during this short data acquisition time. The motion is approximately linear during this short data acquisition time.

Figure 2:
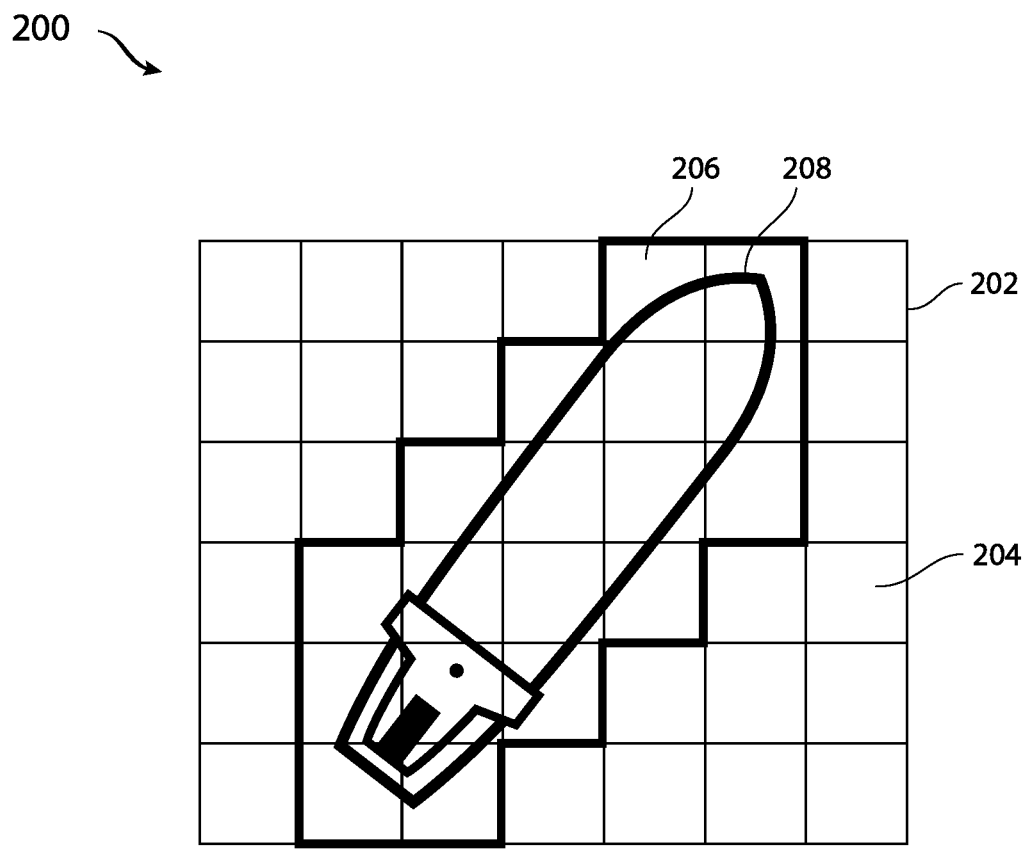
FIG. 2 shows the decomposition of the image into subimages and the identification of relevant subimages which belong to the ship.

FIG. 2 shows a graph 200 of an image. In the radar image 202 in FIG. 2, which is equivalent to the radar image 112 in FIG. 1, acquired using the short data acquisition time t0, the ship occupies more than 20% of the picture elements, so that the water surface surrounding the ship is less than 80%. This image is covered with 42 subimages 204, which are placed on the ship and/or placed at the interface between ship and water surface. Here the 42 subimages 204 do not overlap. In one example, if the ship is wider, there would be subimages that are completely on the ship.

Figure 3:
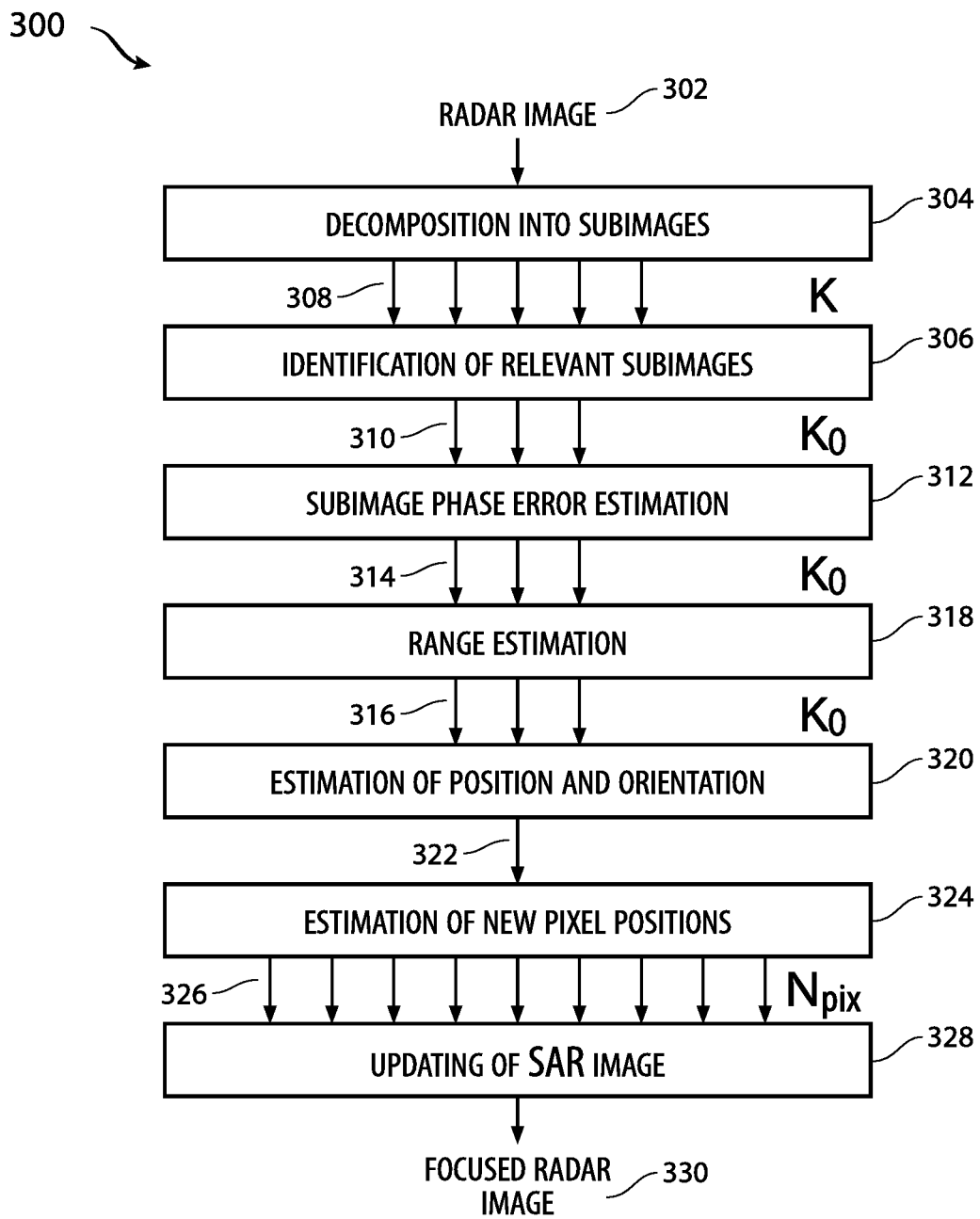
FIG. 3 shows the procedure of determining a change of position and orientation of a ship for several pulses and updating the radar image.

In order to identify those subimages 206 containing the ship from all 42 subimages 204, the amplitude and/or the intensity of each subimage can be averaged. If averaged intensity is larger than a specific threshold, the corresponding subimage 206 belongs to the ship 208. This procedure is also depicted in FIG. 3. In FIG. 3, a series of steps 300 is shown and the radar image of the ship 302, equivalent to 112 in FIGS. 1 and 202 in FIG. 2, is decomposed in subimages in box 304. Afterwards, box 306 gets the K=42 subimages 308 and identifies K0=18 relevant subimages 310, which belongs to the ship.

The determined radar image is also used to find strong reflectors on the ship, such as prominent points. Again, a CFAR detector is used to locate the position of each strong reflector.

If a subimage has a strong reflector, this point is used instead of the center of the subimage for the autofocus procedure. If the subimage does not have a strong reflector, a center point of the subimage is used for the autofocus procedure.

In the next step, the radar receives (by way of example) five consecutive pulses from the illuminated scene. The radar can receive one or more consecutive pulses from the scene. Multiple pulses can be received in an iterative process by the radar.

The autofocus method 312 (subimage phase error estimation) iteratively determines those phase changes 314 of the received five pulses that maximize the sharpness of the subimages. For each subimage and for each of the five consecutive pulses one phase change value is estimated.

When determining the phase changes of the subimages, the image sharpness of the respective subimages is maximized using the additional constraint that the function, which assigns the respective value of the phase changes of the subimage to each center point or position of a strong reflector of a subimage, is approximated by a plane.

The phase changes 314 determine a change in distance 316 (range) for each of the five pulses for each subimage in box 318.

In addition, to determine the change in position and orientation of the object in box 320, only those subimages are taken into account, for which a change in distance has been determined, which are greater than a specified threshold in terms of magnitude.

Especially for subimages, which are almost on the sea and do not show parts of the ship, it might happen that they show strongly fluctuating values in terms of changes in distance. In this case, these values are averaged over time and compared with the specified first and second threshold after determination. Subimages, which show an image of the sea completely or mostly, are below the given first threshold or are clearly above the given second threshold, so that these subimages are not considered. The changes in distance, which are determined for all remaining subimages, indicate thus in each case a change in position and orientation 322 of a part of the object.

By the centers or the positions of strong reflectors of the remaining subimages, for which the respective distances to the radar are known within the tolerance limits, a plane is mathematically adapted. Thus, a change in position and orientation 322 of the entire object are determined on the basis of the changes in distance 316 of each center or the positions of strong reflectors of the subimages. This is based on the assumption that the object is flat.

In the next step 324, new positions 326 of all picture elements (pixels) of the radar image are calculated from the change in position and orientation 322 and the previous positions.

In addition, the radar image can be updated using the five received pulses and the new positions 326 of all pixels in box 328. Thus, a SAR image 330 with a higher quality is obtained.

Figure 4:
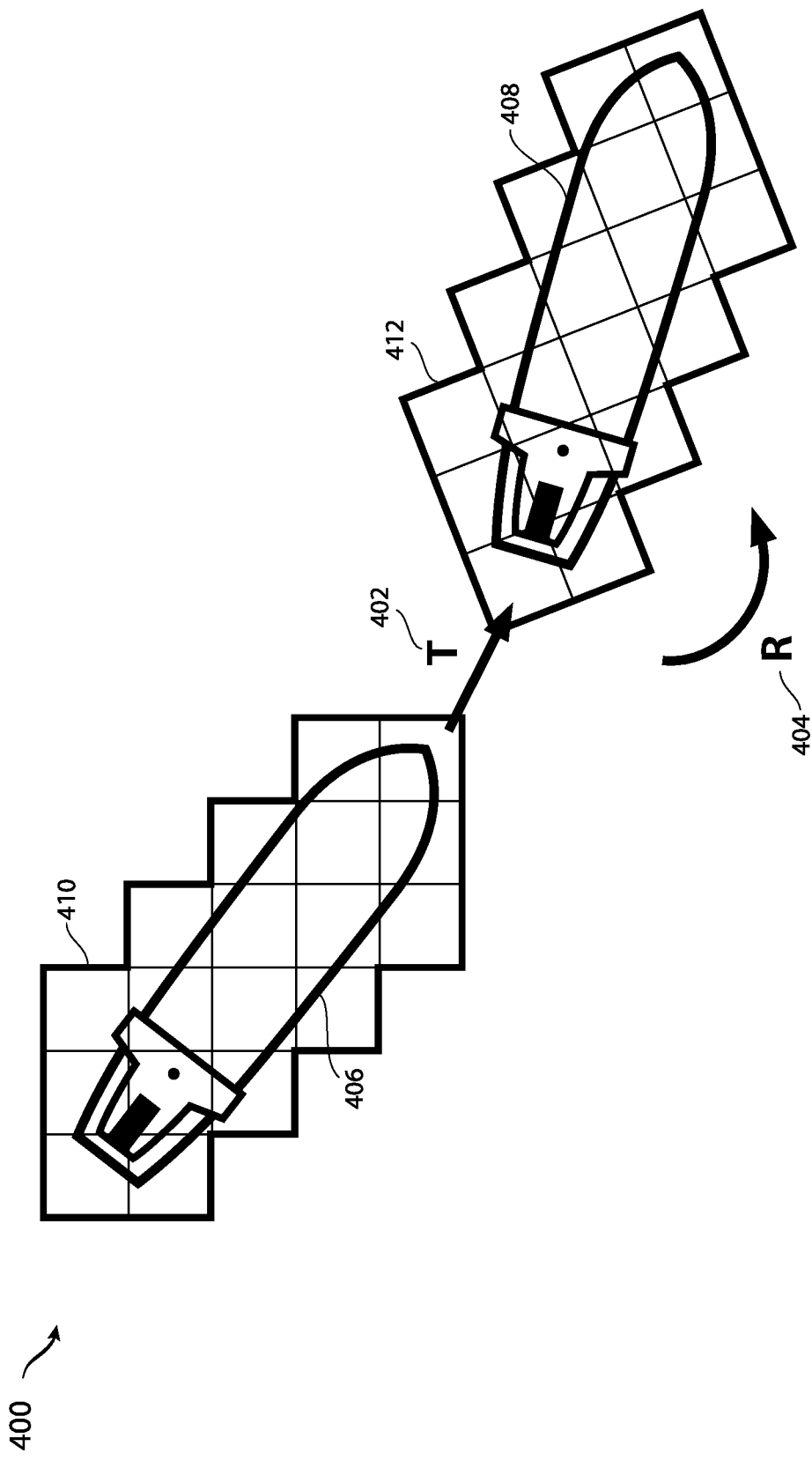
FIG. 4 visualizes the procedure of determining the change in position and orientation from the moving subimages.

The determination of the change in position and orientation in terms of translation 402 and rotation 404 is visualized also in FIG. 4. The motion of the ship from 406 to 408 is described by the change in distance from the radar receiver to the subimage 410 and 412. The translation 402 and the rotation 404 is determined in three dimensions.

With the updated high-resolution radar image 330, it is relatively easy to determine a contour of the object and use that contour to classify the object.

This procedure can be continued iteratively. The previous five pulses (for example) and the changes in position and orientation determined from them are used to generate a new radar image 26 with a higher resolution. This radar image is now used as the radar image 302. Now a further five (or other number) pulses can be used to determine further associated changes in orientation and position. Of course the previous number of pulses can vary from five and can be more or less than five.

A method for determining a change in position and orientation of an object using data from a synthetic aperture radar (SAR) includes the step: acquiring, via the SAR, a radar image containing the object, dividing the radar image into at least two subimages, acquiring short radar information comprising a first reflected pulse and/or a quantity derived therefrom, the first reflected pulse comprising information on image data of the radar image and, for the short radar information, applying an autofocus method which determines a change in distance for each of the at least two subimages. The method also includes determining a change of position and a change in orientation of the object, which is given for each point of the object by the respective change of distance of the corresponding subimage. The method can also include creating an image based on the change of position and the change in orientation of the object. As noted above, the ultimate goal is to utilize the change in position and orientation data in connection with the acquisition time of the SAR image to create sharper image of the moving object than otherwise would be available without the change data.

In one aspect, only those subimages of the at least two subimages for which a distance change was determined which is greater than a specified threshold in magnitude are taken into account to determine the change in position and orientation of the object. The change in position and/or orientation during acquisition time of the SAR image can be used in a step of creating an image of the moving object. The image that is created can be sharper than an image made without the determined change in position and orientation.

In another aspect, the radar image is recorded using a short data acquisition time interval such that it can be assumed that the motion of the object is linear. A center point of the object can be determined using a CFAR detection method. In another aspect, the short radar information can include a first reflected pulse and a second reflected pulse or a quantity derived from the first reflected pulse and/or the second reflected pulse. The first reflected pulse and/or the second reflected pulse can include information about the image data of the radar image. For applying the autofocus method, the phase changes of the first or second reflected pulse can be determined which maximize image sharpness of the subimages, whereby a change in distance can be determined for each subimage.

In another aspect, for determining the change in distance of the subimages, the image sharpness of the respective subimages can be maximized under the additional secondary condition that the function which assigns to each center point of a subimage or to each position of a strong reflector of a subimage the respective value of the change in distance of the subimage is approximated by a plane.

In yet another aspect, if the radar image is divided into at least three subimages, a plane of the object can be mathematically adjusted by at least three points, where the at least three points correspond to midpoints or positions of strong reflectors of the at least three subimages and the respective changes in distance are considered.

If the radar image is divided into at least three subimages, a two-dimensional smooth surface can be mathematically adjusted by at least three points, where the at least three points correspond to midpoints or positions of strong reflectors of the at least three subimages and the respective changes in distance are considered.

In another aspect, the method can further include determining centers of subimages of the at least two subimages for which a change in distance larger in magnitude than the predetermined threshold has been determined and connecting a subset of the determined centers to a closed polygon course so that an enclosed area becomes maximum, whereby the contour of the object is obtained as the subset.

The contour of the object, and in particular the image content of the radar image enclosed by the contour can be assigned to a known contour of an object belonging to a predetermined class.

In another aspect, a method for generating an image of an object can include acquiring, via a synthetic aperture radar, a radar image containing an object, dividing the radar image into at least two subimages and acquiring short radar information comprising a first reflected pulse and/or a quantity derived therefrom, the first reflected pulse comprising information on image data of the radar image. The method can include applying, based on the short radar information, an autofocus method which determines a change in distance for each of the at least two subimages, determining a change of position and a change in orientation of the object to yield a determination, wherein the determination is given for each point of the object by the respective change of distance of the corresponding subimage and creating, based on the determination and the radar image, a new image of the object.

Figure 5:
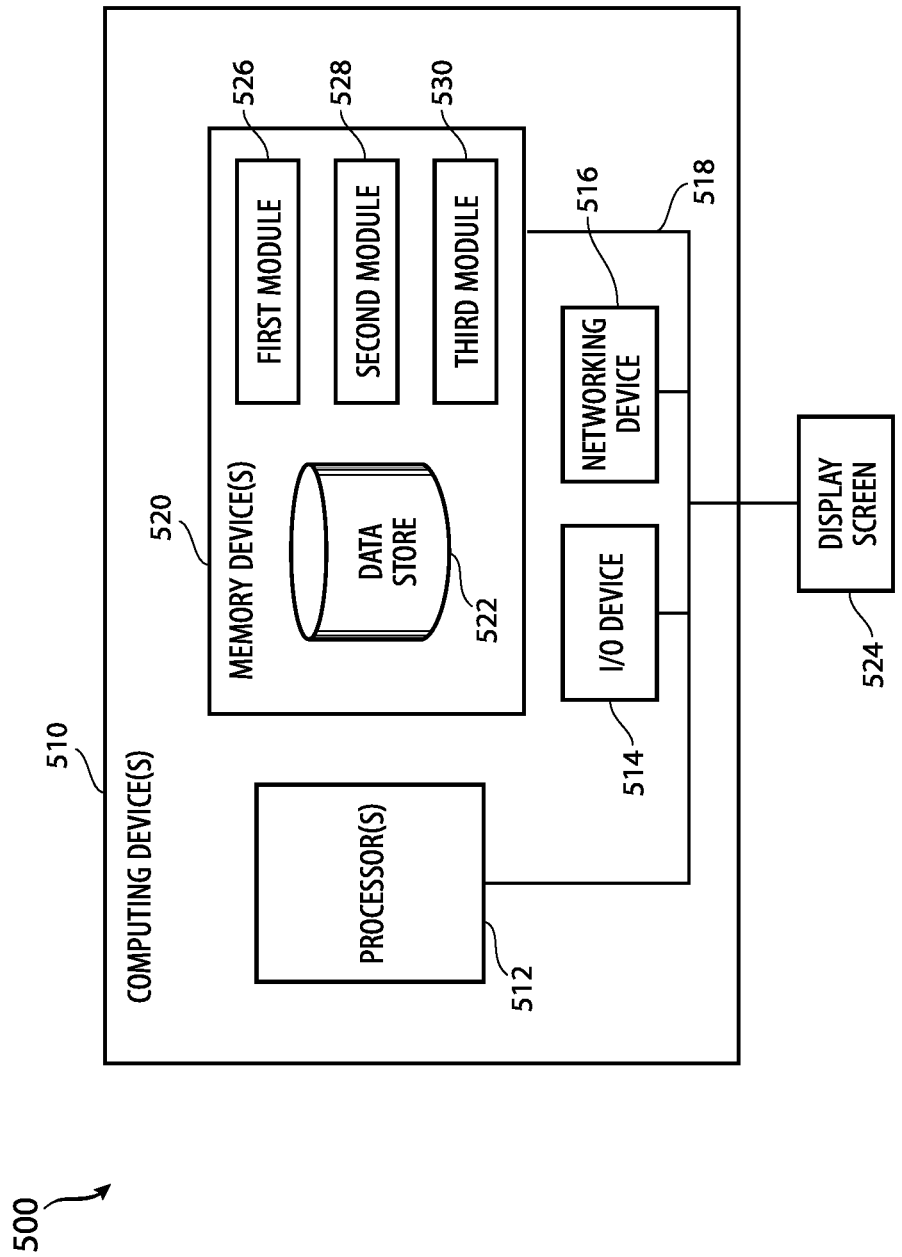
FIG. 5 illustrates basic components for a device.

FIG. 5 illustrates 500 a computing device 510 on which modules of this technology may execute. For example, one or more of the components shown in FIG. 5 can be used to represent hardware features of a device 510. A computing device 510 is illustrated on which a high level example of the technology may be executed. The computing device 510 may include one or more processors 512 that are in communication with memory devices 520. The computing device 510 may include a local communication interface 518 for the components in the computing device. For example, the local communication interface 518 can be a local data bus and/or any related address or control busses as may be desired.

The memory device 520 may contain modules that are executable by the processor(s) and data for the modules. Located in the memory device 520 are modules executable by the processor. For example, a first module 526, a second module 528, and a third module 530, as well as other modules, may be located in the memory device 520. These modules can perform operations such as CFRAR detection or backprojection, or could perform a range estimation. A data store 522 may also be located in the memory device 520 for storing data related to the modules and other applications along with an operating system that is executable by the processor(s) 512. Each module represents a combination of software programming and a hardware component to carry out program steps and does not encompass a signal per se.

The computing device 510 may further include or be in communication with a separate device, which may include a display device, receiving antenna, transmitting antenna or other computing device 524. The device 524 may be available for an administrator to use in interfacing with the computing device 510, such as to review operation of the system, make improvements to the system and so forth.

Various applications may be stored in the memory device 520 and may be executable by the processor(s) 512. Components or modules discussed in this description that may be implemented in the form of software using high programming level languages that are compiled, interpreted or executed using a hybrid of the methods. Any component can be a virtual component as well.

The computing device 510 may also have access to I/O (input/output) devices 514 that are usable by the computing devices. An example of an I/O device 514 is a display screen 524 that is available to display output from the computing devices. The I/O device 514 might represent a transmitting antenna and a receiving antenna. Other known I/O devices may be used with the computing device as desired. Networking device 516 and similar communication devices may be included in the computing device 510. The networking device 516 may be a wired or wireless networking device 516 that connects to the internet, a LAN, WAN, or other computing network.

The components or modules that are shown as being stored in the memory device 520 may be executed by the processor 512. The term "executable" may mean a program file that is in a form that may be executed by a processor 512. For example, a program in a higher level language may be compiled into machine code in a format that may be loaded into a random access portion of the memory device 520 and executed by the processor 512, or source code may be loaded by another executable program and interpreted to generate instructions in a random access portion of the memory to be executed by a processor 512. The executable program may be stored in any portion or component of the memory device 520. For example, the memory device 520 may be random access memory (RAM), read only memory (ROM), flash memory, a solid state drive, memory card, a hard drive, optical disk, floppy disk, magnetic tape, or any other memory components.

The processor 512 may represent multiple processors and the memory 520 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped.

Some of the functional units described in this specification have been labeled as modules, in order to more particularly emphasize their implementation independence. For example, a module may be implemented as a hardware circuit including custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, include one or more blocks of computer instructions, which may be organized as an object, procedure, or function. Nevertheless, the executables of an identified module need not be physically located together, but may include disparate instructions stored in different locations which include the module and achieve the stated purpose for the module when joined logically together.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

In some embodiments the computer-readable storage devices, mediums, and memories used herein can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

We claim:

1. A method for determining a change in position and orientation of an object using data from a synthetic aperture radar (SAR), the method comprising:
   acquiring, via the SAR, a radar image containing the object;
   dividing the radar image into at least two subimages;
   acquiring short radar information comprising a first reflected pulse and/or a quantity derived therefrom, the first reflected pulse comprising information on image data of the radar image;
   for the short radar information, applying an autofocus method which determines a respective change in distance for each of the at least two subimages; and
   determining a change of position and a change in orientation of the object, which is given for each point of the object by the respective change of distance for each of the at least two subimages, wherein, for determining the change in distance of the at least two subimages, an image sharpness of respective subimages are maximized under an additional secondary condition that a function which assigns to each center point of a subimage or to each position of a strong reflector of a subimage a respective value of the change in distance of the subimage is approximated by a smooth two-dimensional surface.

2. The method of claim 1, wherein only those subimages of the at least two subimages for which a distance change was determined which is greater than a specified threshold in magnitude are taken into account to determine the change in position and orientation of the object.

3. The method of claim 1, wherein the radar image is recorded using a short data acquisition time interval such that it can be assumed that a motion of the object is linear.

4. The method of claim 1, wherein a center point of the object is determined using a constant false alarm rate (CFAR) detection method.

5. The method of claim 1, wherein the short radar information comprises a first reflected pulse and a second reflected pulse or a quantity derived from the first reflected pulse and/or the second reflected pulse, wherein the first reflected pulse and/or the second reflected pulse comprises information about the image data of the radar image.

6. The method of claim 1, wherein for applying the autofocus method, phase changes of the first reflected pulse or the second reflected pulse are determined which maximize image sharpness of the at least two subimages, whereby a change in distance can be determined for each subimage.

7. The method of claim 1, wherein, if the radar image is divided into at least three subimages, a plane of the object is mathematically adjusted by at least three points, where the at least three points correspond to midpoints or positions of strong reflectors of the at least three subimages and respective changes in distance are considered.

8. The method of claim 1, wherein, if the radar image is divided into at least three subimages, the smooth two-dimensional surface is mathematically adjusted by at least three points, where the at least three points correspond to midpoints or positions of strong reflectors of the at least three subimages and respective changes in distance are considered.

9. The method of claim 1, further comprising:
determining centers of subimages of the at least two subimages for which a change in distance larger in magnitude than a predetermined threshold has been determined to yield determined centers; and
connecting a subset of the determined centers to a closed polygon course so that an enclosed area becomes maximum, whereby a contour of the object is obtained as the subset.

10. The method of claim 8, wherein a contour of the object, and in particular an image content of the radar image enclosed by the contour is assigned to a known contour of an object belonging to a predetermined class.

11. A synthetic aperture radar comprising:
a processor; and
a computer-readable medium storing instructions which, when executed by the processor, cause the processor to perform operations comprising:
acquiring a radar image containing an object;
dividing the radar image into at least two subimages;
acquiring short radar information comprising a first reflected pulse and/or a quantity derived therefrom, the first reflected pulse comprising information on image data of the radar image;
for the short radar information, applying an autofocus method which determines a respective change in distance for each of the at least two subimages; and
determining a change of position and a change in orientation of the object, which is given for each point of the object by the respective change for each of the at least two subimages, wherein, for determining the change in of the object, an image sharpness of respective subimages are maximized under an additional secondary condition that a function which assigns to each center point of a subimage or to each position of a strong reflector of a subimage a respective value of the change in distance of the subimage is approximated by a smooth two-dimensional surface.

12. The synthetic aperture radar of claim 11, wherein only those subimages of the at least two subimages for which a distance change was determined which is greater than a specified threshold in magnitude are taken into account to determine the change in position and orientation of the object.

13. The synthetic aperture radar of claim 11, wherein the radar image is recorded using a short data acquisition time interval such that it can be assumed that a motion of the object is linear.

14. The synthetic aperture radar of claim 11, wherein a center point of the object is determined using a constant false alarm rate (CFAR) detection method.

15. The synthetic aperture radar of claim 11, wherein the short radar information comprises a first reflected pulse and a second reflected pulse or a quantity derived from the first reflected pulse and/or the second reflected pulse, wherein the first reflected pulse and/or the second reflected pulse comprises information about the image data of the radar image.

16. The synthetic aperture radar of claim 11, wherein for applying the autofocus method, phase changes of the first reflected pulse or the second reflected pulse are determined which maximize image sharpness of the at least two subimages, whereby a change in distance can be determined for each subimage.

17. The synthetic aperture radar of claim 11, wherein, if the radar image is divided into at least three subimages, a plane of the object is mathematically adjusted by at least three points, where the at least three points correspond to midpoints or positions of strong reflectors of the at least three subimages and respective changes in distance are considered.

18. The synthetic aperture radar of claim 11, wherein, if the radar image is divided into at least three subimages, the smooth two-dimensional surface is mathematically adjusted by at least three points, where the at least three points correspond to midpoints or positions of strong reflectors of the at least three subimages and respective changes in distance are considered.

19. A method for generating an image of an object, the method comprising:
acquiring, via a synthetic aperture radar, a radar image containing an object;
dividing the radar image into at least two subimages;
acquiring short radar information comprising a first reflected pulse and/or a quantity derived therefrom, the first reflected pulse comprising information on image data of the radar image;
applying, based on the short radar information, an autofocus method which determines a change in a respective distance for each of the at least two subimages;
determining a change of position and a change in orientation of the object to yield a determination, wherein the determination is given for each point of the object by a respective change for each of the at least two subimages, wherein, for determining the change the position and the change in the orientation of the object, an image sharpness of respective subimages are maximized under an additional secondary condition that a function which assigns to each center point of a subimage or to each position of a strong reflector of a subimage a respective value of the change in distance of the subimage is approximated by a smooth two-dimensional surface; and creating, based on the determination and the radar image, a new image of the object.

* * * * *